United States Patent Office 3,398,129
Patented Aug. 20, 1968

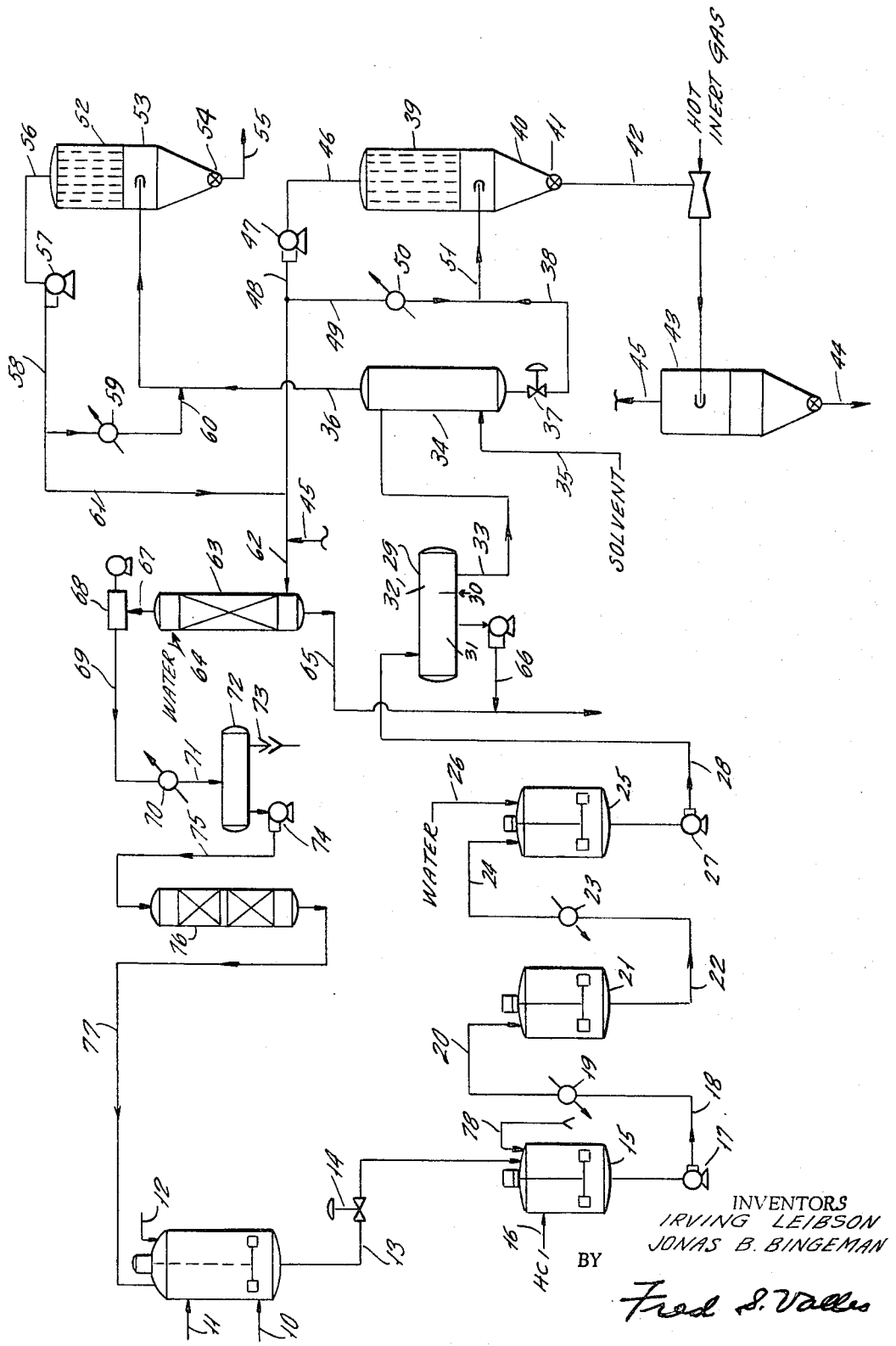

3,398,129
PROCESS FOR PREPARING PREDOMINANTLY CRYSTALLINE ALPHA-OLEFIN POLYMERS
Irving Leibson, Odessa, Tex., and Jonas B. Bingeman, Tarzana, Calif., assignors to Rexall Drug and Chemical Company, Los Angeles, Calif., a corporation of Delaware
Filed Aug. 30, 1963, Ser. No. 305,770
7 Claims. (Cl. 260—93.7)

This invention relates to a process for preparing predominantly crystalline alpha-olefin polymers by separation by dissolution of atactic and/or low molecular weight polymer fractions from alpha-olefin polymer slurries.

In known processes for manufacture of alpha-olefin polymers employing titanium halides and aluminum alkyls as catalysts for polymerization, there are obtained high molecular weight highly crystalline polymers such as polyethylene, polypropylene, polybutene, etc. The highly crystalline polymers prepared from the corresponding alpha-olefins are useful in many applications, for example, injection and blow molded articles, film and others, as is known in the art. Alpha-olefin polymers of a high crystalline content, for example, polypropylene containing 80 to 90 percent or more of an isotactic structure can be prepared by known polymerization techniques, while an even higher crystalline content can be obtained by employing techniques of extracting the low molecular weight or atactic portion of the polymer usually by the use of a boiling aliphatic hydrocarbon such as heptane, as illustrated in British Patent 810,023.

In alpha-olefin polymerization processes as described in British Patents 799,392 (ethylene), 810,023 and Belgian 543,259 (propylene and higher including styrene), there are produced polymers of a high crystalline content but containing, however, a minor amount of low molecular weight or atactic fractions which can be separated by treatment with solvents such as acetone and heptane. For example, crude polypropylene of an isotactic content of 80% can be upgraded several percent (up to 95% or more) by dissolving the atactic fractions in boiling n-heptane, while linear polyethylene can be upgraded by removing amorphous fractions by dissolving them in boiling acetone.

Predominantly crystalline alpha-olefin polymers, that is, those containing two percent or less of waxy or atactic fractions are highly desirable in the manufacture of monofilaments, film, sheet and fibers. Crystalline content is important to these products since it imparts strength and maximum uniformity thereto. Applications of the type referred to require that alpha-olefin polymers, for example polypropylene, polyethylene, contain a minimum of atactic or waxy fractions, preferably less than 5 percent. To obtain polypropylene or polyethylene of from 95 to 98 percent or higher crystalline content, however, would require separate solvent extraction facilities for the raw polymer, such facilities leading to increased costs due to solvent, equipment and other processing units associated therewith.

It is an object of this invention to provide an economical process for preparing predominantly crystalline alpha-olefin polymers.

It is a further object of this invention to provide a novel process for preparing predominantly crystalline alpha-olefin polymers by employing a light hydrocarbon solvent to extract atactic fractions from said polymers, which solvent can be readily separated from the extracted polymer fractions by flashing therefrom and as a consequence eliminating mechanical filtration.

A specific object of this invention is to provide an economical process for preparing predominantly crystalline alpha-olefin polymers containing substantially no low molecular weight or atactic polymer fractions and being suitable for manufacture of monofilaments, films and fibers.

A still more specific object of this invention is the preparation of polypropylene of an isotactic content greater than 95% and linear polyethylene of a crystalline content approaching 100%.

Other objects will be apparent from a description of this invention.

This invention provides an improved process for attaining the objects outlined above, where an alpha-olefin is polymerized in a hydrocarbon dispersing medium and the resulting alpha-olefin polymer is in the form of a slurry and the polymer contains at least two percent by weight of an atactic fraction as hereinafter defined, the improvement comprising introducing said slurry into a treating zone, introducing into said zone a hydrocarbon solvent medium containing from 1 to 5 carbon atoms in an amount of from 0.5 to 10 lbs. of hydrocarbon solvent per pound of polymer at a temperature sufficient to dissolve said atactic fraction, said temperature ranging from 40 to 250° F. and recovering from said treating zone at least two separate streams, one a hydrocarbon solvent stream containing atactic polymer in solution and the other a slurry stream consisting essentially of hydrocarbon dispersing medium and predominantly crystalline alpha-olefin polymer.

Certain terms as used in this specification and in the appended claims are intended to have the following meaning: (a) By "atactic fraction" is meant that portion of the alpha-olefin polymer which is non-crystalline as determined by known methods, that is, by X-ray analysis. For linear polyethylene this would be an amorphous fraction of non-linear structure readily soluble in hot paraffinic hydrocarbons and including oily and waxy fractions of low molecular weight. For polypropylene and higher alpha-olefin polymers such as those of butene-1, pentene-1, 3-methyl-butene-1, 4-methyl-pentene-1, 4-methyl hexene-1, 5-methyl hexene-1 and styrene atactic fraction means the non-crystalline fraction as is known in the art. See Gaylord and Mark, "Linear and Stereoregular Addition Polymers," pages 54–66 and 158–162; Interscience Publishers (1959). (b) By a "hydrocarbon dispersing medium" is meant the medium in which polymerization of the monomer occurs and includes saturated paraffinic hydrocarbons of from 1 to 5 carbon atoms, which if normally gaseous, are under the conditions of polymerization in the reactor, in liquid form. Where the monomer is employed in liquid form and serves as its own dispersing medium, or when a heterogeneous mixture of liquid monomer and liquid (normally or under the conditions of polymerization) hydrocarbon is employed in the polymerization, then the definition applies. (c) By a "hydrocarbon solvent medium" is meant a paraffinic saturated or unsaturated hydrocarbon containing from 1 to 5 carbon atoms which is introduced to contact an alpha-olefin polymer slurry to extract atactic fractions therefrom under stated conditions of temperature, pressure and volume. (d) By the term "slurry" is meant that solid alpha-olefin polymer is dispersed in particle form in the hydrocarbon dispersing medium in varying amounts depending on the percent conversion in the reactor which normally may result in from about 15 to 60% total solids. (e) Alpha-olefins include those mentioned under (a) as well as ethylene.

The hydrocarbon dispersing or solvent media include such hydrocarbons as methane, ethane, propane, butane and pentane which can be readily recovered from a polymer slurry by flashing therefrom thereby eliminating the need for mechanical filtration of the polymer. As noted, however, the dispersing medium can also be the alpha-olefin monomer in liquid form such as liquid propylene or butene-1 or in combination with paraffinic hydrocarbons of from 1 to 5 carbon atoms, such as liquid propylene with liquid propane. A specific feature of this invention is the employment of light hydrocarbons in the process, specifically hydrocarbons having low boiling points. Certain advantages are realized by operating according to this technique which are not realized by use of higher boiling hydrocarbons such as heptane, octane and the like.

In a preferred embodiment of this invention the hydrocarbon solvent medium is identical to the hydrocarbon dispersing medium employed in the polymerization of the particular alpha-olefin. Where, however, the alpha-monomer is used as its own dispersing medium as in the case of liquid propylene or butene-1, then the solvent medium need not be identical. Thus, if propylene is polymerized in liquid form in the substantial absence of other diluents, then pentane can advantageously be used as the solvent medium since this higher molecular weight hydrocarbon would be capable of dissolving and extracting more of the atactic polymer fraction than propylene.

In accordance with the foregoing, ethylene can be polymerized in the presence of liquid butane as the dispersing medium and liquid butane can then be used to extract atactic polymer from the slurry as will be described hereinbelow. Propane can be used as the polymerization medium in propylene polymerization or mixtures of liquid propylene and propane, the latter being used in amounts of from 5 to 95% for example. Where an added dispersing agent is present, that is, propylene-propane or propylene-pentane, then propane or pentane can be used as the hydrocarbon solvent. Where a different hydrocarbon is used as a solvent mixing of the dispersing and solvent hydrocarbon would occur and would require an additional fractionating step for separation of these two compounds in the diluent recovery section. Where the dispersing and solvent media are the same, the two streams recovered (see below) from the atactic polymer fraction and the crystalline polymer fraction can be combined and purified in the same diluent recovery section. This obviously, is very advantageous.

Although the nature of this invention has been described generally above, reference is now made to the attached drawing which forms a part hereof and which illustrates an arrangement of processing units for attaining the objects of this invention.

In the drawing, an olefin monomer enters a stirred polymerization reactor 10 through a feedline 11. Catalyst enters the reactor through line 12 and light hydrocarbon recycle diluent, which has make-up diluent added thereto, enters through line 77. Hydrogen or other molecular weight control agents can be also used in this process. As the polymer is formed in the reactor, it is removed as a slurry in the hydrocarbon dispersing agent through line 13 and valve 14. Polymer slurry passing through valve 14 is conveyed into a stirred quench tank 15. Alcohol (methanol, ethanol, isopropanol, etc.) for the catalyst deactivation enters the quench tank through line 78 together with small amounts of hydrochloric acid through line 16. The alcohol, hydrochloric acid and catalyst residues extracted are water-soluble impurities which are removed in other processing units.

The slurry from quench tank 15 is removed by pump 17 and conveyed through line 18 to heat exchanger 19 where it is heated and then passed through line 20 into a stirred heat treating vessel 21. Complete deactivation and solubilization of the catalyst occurs in this unit. The slurry is conveyed from the heat treating vessel through line 22 to a second heat exchanger 23 where the slurry is preferably cooled and then through line 24 from which the polymer slurry enters a stirred water mixing vessel 25. Water enters the mixing vessel through line 26 and is thoroughly mixed with the slurry by agitation. The aqueous slurry is removed from the bottom of the mixing vessel by pump 27 from which it is conveyed through line 28 to a settling drum 29.

The aqueous polymer slurry in the settling drum forms two phases, one an aqueous phase which settles to the bottom of the drum and a light hydrocarbon diluent phase which floats on top of the water. A dividing wall 30 is arranged near one end of the drum to divide it into a large chamber 31 and a small chamber 32.

The hydrocarbon polymer slurry is drawn off by decantation through line 33 into the top portion of an extraction column 34 from where it flows downwardly. Hydrocarbon solvent is introduced to the bottom of the column through line 35 and flows countercurrent to the slurry. The solvent containing dissolved atactic polymer is withdrawn from the top of the column through line 36. The slurry, substantially free of atactic fractions, is removed from the extraction column through preferably a conventional pulsed intermittent discharge valve 37 from whence it is passed through line 38 into a combination bag filter-cyclone separator 39 and 40. The slurry in the bag filter-cyclone is flashed and the substantially dry crystalline polymer powder is removed from the cyclone portion through line 42 controlled by valve 41. The polymer powder containing less than 5 percent volatiles and being predominantly crystalline is taken next to a drier designated generally at 43. The dry polymer powder exits from the drier through line 44 and is taken to other processing units. From the top of the drier 43, volatile light hydrocarbons are removed from the polymer and taken via line 45 to the diluent clean up units to be described below.

The flashed hydrocarbon dispersing medium from bag filter-cyclone 39 and 40 is taken through line 46, blower 47, line 48 from which a portion of it is recycled through line 49 to heat exchanger 50 to line 51 and line 38 for return to the cyclone separator to aid in the flashing operation.

The hydrocarbon solvent from the extraction column 34 which contains dissolved atactic polymer is taken through line 36 into a second bag filter-cyclone combination unit 52 and 53 where solvent is flashed off and the atactic polymer in powder form settles to the bottom of the cyclone 53 and is removed through line 55 controlled by valve 54. The flashed hydrocarbon solvent passes through bag filter 52 where any entrained polymer dust or powder is removed and then exits therefrom through line 56. A blower 57 conveys the solvent vapor through line 58 into line 61 which is the line conveying hydrocarbon dispersing medium from the first bag filter-cyclone separator 39 and 40. A portion of the solvent is tapped from line 58 and is passed through a heat exchanger 59 and then through line 60 into line 36 where it mixes with the incoming solvent and aids in the flashing operation. The combined hydrocarbon stream in lines 61, 48 and 45 is conveyed by line 62 into the bottom portion of a water scrubber 63. Water is fed through line 64 into the top of the water scrubber and flows countercurrent to the recycle hydrocarbon stream, water-soluble impurities in the stream being absorbed and removed by the water. The water passing through the scrubber passes to the bottom thereof through line 65 and then to a conventional alcohol recovery section where alcohol in this stream is recovered (not shown). Line 65 is joined by line 66 which serves to remove the aqueous alcohol phase from drum 29. This aqueous alcohol phase contains solubilized catalyst residues.

The purified hydrocarbon stream after scrubber 63 is conveyed through line 67 and is compressed in compressor 68. The compressed recycle stream passes through line 69 to heat exchanger 70 and then through line 71 into a settling tank 72 where water condensate is removed therefrom through line 73. The stream is then conveyed by pump 74 through line 75 into adsorber 76 (containing a suitable adsorbent material such as silica gel, alumina, molecular sieves, etc.) where any water remaining is removed and the stream exits, dry and purified, through line 77 and can then be used in the polymerization reaction.

The process of this invention is particularly adaptable to alpha-olefin polymerization and copolymerization processes in which alpha-olefin monomers of the type hereinbefore referred to are employed and polymerized with a catalyst prepared from a reducible compound of the halide salts of the metals of Groups IV through VI of the periodic table including thorium and uranium and a reducing agent such as an aluminum compound containing at least one bond connected to an organic group, for example, aluminum alkyls. Suitable catalysts are those described in British Patents 799,392, 810,023 and Belgian 543,259 referenced herein.

According to the preferred process of this invention as illustrated above, the removal of atactic polymer fractions is accomplished immediately after the polymer slurry has been deashed (taken from unit 29). However, prior deashing is not a requisite since the polymer slurry can be taken directly from reactor discharge line 13 to extraction column 34 and the deashing treatment performed on polymer exiting from cyclone 40. Any technique for deashing the polymer as known in the art can be employed.

It will be appreciated that the polymer slurry in either embodiment can be passed through any suitable treating zone such as column 34 in which hydrocarbon solvent can be brought into intimate contact with the polymer slurry. Excellent results are obtained when an olefin polymerization product is treated in a counter-current extraction column in which the ratio of the introduced hydrocarbon solvent to the polymer in the column varies from about 0.5 to about 10 pounds per pound of polymer, and the temperature in the column varies from about 40° to about 250° F., but preferably from 100° to 250° F. at normal pressures. Polymer product in the slurry exiting from the column, in a preferred manner of operation, is a thick slurry (dispersing agent and polymer) containing from 20 to 70% solids which are removed by the employment of a pulsed intermittent discharge valve at the outlet of the column. By operating according to this technique, plugging is prevented in the discharge line and an uninterrupted flow of slurry is assured.

The pressure in the extraction column 34 in accordance with the process herein is maintained equal to or in excess of the vapor pressure of the hydrocarbons present so that they are maintained as liquids. For example, if the extraction and reactor diluents are both propylene, the column would operate at least at 220 p.s.i.a. at 200° F., at 410 p.s.i.a. at 150° F., etc. For butane diluent the pressure at 150° F. would be equal to or in excess of 103 p.s.i.a.

The process of this invention is operative to upgrade an alpha-olefin polymer to a crystalline content in excess of 95 percent in an economic manner since the solvent and dispersing agent can be similar or different and can be recovered from the atactic and crystalline polymers simply by a flashing operation in conventional equipment (bag filter-cyclones) employed in alpha-olefin polymer manufacturing establishments. The fact that the hydrocarbon solvents can also extract atactic fractions from crystalline alpha-olefin polymers, provides a unique processing combination operation not heretofore described.

At the preferred temperatures of extraction of from 100 to 250° F. substantially all atactic polymer is dissolved from crystalline alpha-olefin polymers. The best temperature for extracting individual homo or copolymers will depend on the nature of the polymer and this is readily ascertainable from published information or by simple experiment. Thus, polypropylene containing an isotactic content of 90 percent can be readily upgraded to an isotactic content of 98.5% (heptane insoluble content) by using pentane as the solvent medium and extraction temperatures of about 200° F. for a short contact period (a few minutes) as would occur in counter-current flow in an extraction column. At these extraction temperatures also, flashing of the solvent from the atactic material dissolved would readily occur. A polyethylene containing 5% of waxy polymer could, under the same conditions or with butane as the solvent, be produced with substantially no waxy content, that is a substantially wax free product. On the other hand, an alpha-olefin polymer such as pentene-1 would require lower extraction temperatures, since the first order transition point of this polymer (isotactic) is about 80° C. It is essential to the process of this invention that the crystalline alpha-olefin polymer be maintained in the solid or undissolved state. An appropriate extraction temperature falling within the preferred range can thus be selected and employed in the process.

In order to illustrate the process of this invention by way of example, the following operation wherein propylene is employed as the alpha-olefin and is used as its own dispersing agent with pentane employed as the solvent medium, is presented herewith. To polymerization vessel 10 is introduced 4,000 pounds per hour of liquid propylene and polymerization is carried out to a solids concentration of 40 weight percent. The temperature of polymerization is approximately 150° F. and the pressure is 400 p.s.i.g. A 2 to 4 hour residence time is required to obtain 40% solids concentration. The catalyst used is a titanium trichloride activated with diethylaluminum chloride, the mol ratio of aluminum to titanium being 1.0 to 4.0. Reactor discharge line 13 includes 4,000 pounds of polymer per hour in 6,000 pounds of liquid propylene, which mixture is in slurry form and is introduced to vessel 15 for catalyst deactivation. To vessel 15 there is added via line 78, 1500 pounds of methanol and about 0.1% HCl based on the methanol, to deactivate the catalyst. From vessel 15 there is withdrawn the alcohol-polymer slurry through line 18 and heated in heater 19 to a temperature of about 180° F. prior to introduction to heat treat vessel 21. After a heat treating period of approximately one-half hour, the mixture is withdrawn through line 22 to water mixing tank 25 where 400 pounds of water per hour are added through line 26. Line 28 conveys the mixture which now consists of 6,000 pounds of liquid propylene, 4,000 pounds of solid polymer, 1500 pounds of liquid methanol and 400 pounds of water to settling drum 29. Phase separation occurs in the drum as was heretofore explained and there is decanted through line 33 6,000 pounds per hour of liquid propylene, 4,000 pounds of solid polymer, 20 pounds per hour of liquid methanol and 2 pounds of water. This alpha-olefin polymer slurry which contains a polymer of propylene of an isotactic content of 95% is now introduced to counter-current extraction column 34 and is contacted with 12,000 pounds of liquid pentane per hour through line 35. From the top of the column, line 36 conveys 15,442 pounds of liquid pentane, propylene, methanol and water, containing dissolved therein 140 pounds of atactic polymer which is introduced to bag filter-cyclone 53 and 52. The temperature in bag filter-cyclone is 200° F. and the pressure is slightly above atmosphere (about 10 p.s.i.g.). Flashing of the liquid occurs in the cyclone and line 56 conveys 30,000 pounds of vapor per hour which is taken through blower 57 and line 58. Approximately 14,558 pounds of vapor are diverted from line 58 through heater 59 and heated to a temperature of approximately 300° F. The heated vapor is then led via line 60 to line 36 to aid in the flashing operation. Line 61 conveys the remainder of the vapor to other processing units for purification of the solvent (not indicated in the drawing. In the drawing there is indicated that line 61 joins line 62. However, this arrangement is provided only where a dispersing and solvent medium are similar). From cyclone 53 there is withdrawn 140 pounds of atactic polymer through valve 54 and line 55 for further disposal.

From the bottom of counter-current extraction column 34 there is withdrawn 3,860 pounds of crystalline polypropylene of 98.5% heptane insolubles content in the form of a slurry consisting of 60% solids in a liquid (2580 pounds per hour) containing pentane, propylene, methanol and water through discharge valve 37. Line 38 conveys the mixture to bag filter-cyclone 39 and 40 which is maintained at a temperature of 200° F. and a pressure similar to that of bag filter-cyclone 53–52. From the bottom of cyclone 40 through valve 41 there is withdrawn 3860 pounds of crystalline polypropylene per hour to line 42 and drier 43. From the bag filter 39 there is withdrawn 5,000 pounds of pentane, propylene, methanol and water vapor through line 46 to blower 47 and line 48. From line 48, 2420 pounds of propylene are diverted through line 49, heater 50 where the vapor is heated to approximately 300° F. and taken through line 51 for recycling to the cyclone to aid in the flashing operation.

The remainder of the vapor is taken to line 62, water scrubber 63 (to remove methanol) where it is contacted with 30 gallons of water per minute through line 64. Water and water soluble impurities (methanol) are removed from vessel 63 through 65 for further processing. From the top of the column, line 67 conveys pentane and propylene vapor containing some moisture through pump 68, line 69 and cooling unit 70. Entrained moisture is condensed in vessel 72 and the vapor is thereafter taken to line 75 to adsorber column 76 from whence it issues through line 77 as dry, substantially pure recycle propylene and pentane. A further step (not drawn) can consist of a simple distillation to separate the pentane from the propylene. The propylene can then be recycled to the extraction column 34.

Although an example has been presented with respect to the upgrading of polypropylene according to the process of this invention, it should be understood that any of the previously mentioned alpha-olefin polymers can likewise be processed. For example, polyethylene can be upgraded similarly, except that in this case butane is used as the dispersing and solvent media.

The temperature required to accomplish vaporization of the hydrocarbon solvent generally would be between 50–200° F. in bag filter-cyclone unit 52–53, depending on the type of solvent used.

The process of this invention is capable of removing very readily from 5–10% of the total polymer entering column 34 as atactic material, as illustrated in the example above.

Modifications and changes can be incorporated in this process falling within the scope of the apended claims and the spirit of the invention.

What is claimed is:

1. In a process wherein an alpha-olefin is polymerized to a predominantly crystalline form in a hydrocarbon dispersing medium and the resulting polymer is contacted in a catalyst residue removal zone to remove catalyst residues therefrom and to obtain a substantially uncontaminated deashed polymer and wherein said deashed polymer is in the form of a slurry in said dispersing medium and contains at least 2 percent by weight of an atactic fraction and wherein the polymer is subsequently treated with a hydrocarbon solvent medium containing from 3 to 5 carbon atoms to upgrade said polymer by removing substantially the atactic fraction therefrom, the improved process which consists essentially of the steps:

(a) contacting said deashed polymer in a countercurrent extraction zone with a hydrocarbon solvent by introducing from 0.5 to 10 pounds of said hydrocarbon solvent containing from 3 to 5 carbon atoms per pound of polymer, said countercurrent contact occurring at a temperature of from 100° to 250° F. and at a pressure sufficient to maintain the hydrocarbon solvent in liquid form, (b) separating from said countercurrent contacting zone two separate streams, one an overhead solution stream consisting essentially of said hydrocarbon solvent and hydrocarbon dispersing medium containing substantially all of said atactic fraction dissolved therein and the other a slurry stream consisting essentially of said hydrocarbon solvent and hydrocarbon dispersing medium containing therein solid essentially crystalline polymer particles, (c) introducing said solution stream into a first low pressure flashing zone and said slurry stream into a second low pressure flashing zone, both said low pressure flashing zones being maintained at a temperature of from 50° to 200° F. and a pressure slightly above atmospheric pressure and (d) separately recovering from said first low pressure flashing zone hydrocarbon solvent and hydrocarbon dispersing medium vapor overhead and a solid atactic polymer precipitated from said solution stream in powder form, and separately recovering from said second low pressure flashing zone hydrocarbon solvent and hydrocarbon dispersing medium vapor overhead and a predominantly solid uncontaminated crystalline polymer in powder form containing less than 5 percent volatiles.

2. The process of claim 1 wherein ethylene is the alpha-olefin, and the hydrocarbon dispersing and solvent media are saturated paraffinic hydrocarbons.

3. The process of claim 2 wherein butane is the dispersing and solvent medium.

4. The process of claim 1 wherein propylene is the alpha-olefin and liquid propylene is the dispersing medium.

5. The process of claim 4 wherein the solvent medium is a saturated paraffinic hydrocarbon containing from 3 to 5 carbon atoms.

6. The process of claim 1 wherein butene-1 is the alpha-olefin.

7. The process of claim 1 wherein 4-methyl-pentene-1 is the olefin.

References Cited

UNITED STATES PATENTS

| | | | |
|---|---|---|---|
| 3,167,536 | 1/1965 | Zampachova et al. | 260—93.7 |
| 3,197,454 | 7/1965 | Plaster | 260—93.7 |

JOSEPH L. SCHOFER, *Primary Examiner.*

L. EDELMAN, *Assistant Examiner.*